(12) United States Patent
Takamatsu

(10) Patent No.: US 10,976,649 B2
(45) Date of Patent: Apr. 13, 2021

(54) LIGHT SOURCE APPARATUS, IMAGE DISPLAY APPARATUS, AND OPTICAL UNIT

(71) Applicant: SONY CORPORATION, Tokyo (JP)

(72) Inventor: Takashi Takamatsu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/078,711

(22) PCT Filed: Feb. 3, 2017

(86) PCT No.: PCT/JP2017/004062
§ 371 (c)(1),
(2) Date: Aug. 22, 2018

(87) PCT Pub. No.: WO2017/169114
PCT Pub. Date: Oct. 5, 2017

(65) Prior Publication Data
US 2019/0056645 A1    Feb. 21, 2019

(30) Foreign Application Priority Data

Mar. 31, 2016 (JP) .............................. JP2016-070204

(51) Int. Cl.
*G03B 21/20* (2006.01)
*G03B 21/16* (2006.01)
(Continued)

(52) U.S. Cl.
CPC .............. *G03B 21/204* (2013.01); *F21S 2/00* (2013.01); *F21V 29/502* (2015.01); *F21V 29/70* (2015.01);
(Continued)

(58) Field of Classification Search
CPC ...... G03B 21/204; G03B 21/14; G03B 21/16; G03B 21/00; G03B 21/006; F21V 29/502;
(Continued)

(56) References Cited

U.S. PATENT DOCUMENTS 6,598,977 B1 * 7/2003 Chen .................... G02B 26/008
                                                                    348/743
2001/0046025 A1   11/2001 Ishii et al.
(Continued)

FOREIGN PATENT DOCUMENTS

CN          101359076 A        2/2009
CN          104216208 A        12/2014
(Continued)

OTHER PUBLICATIONS

Extended European Search Report dated Nov. 29, 2018 in corresponding European Patent Application No. 17773663.4, 8 pages.
(Continued)

*Primary Examiner* — Anabel Ton
(74) *Attorney, Agent, or Firm* — Oblon, McClelland, Maier & Neustadt, L.L.P.

(57) ABSTRACT

A light source apparatus according to an embodiment of the present technology includes a wheel, a rotation drive unit, and a first adhesive material. The wheel includes a light-emitting body that emits visible light by being excited. The rotation drive unit includes a support surface including a reference surface that comes into contact with the wheel and a non-contact surface that is set apart from the wheel, and causes the wheel supported by the support surface to rotate. The first adhesive material is filled in at least a part of a gap between the non-contact surface and the wheel.

15 Claims, 12 Drawing Sheets

(51) Int. Cl.
 *G03B 21/14* (2006.01)
 *F21S 2/00* (2016.01)
 *F21V 29/502* (2015.01)
 *F21V 29/70* (2015.01)
 *G02B 7/00* (2021.01)
 *G02B 26/00* (2006.01)
 *G03B 21/00* (2006.01)
 *G03B 33/12* (2006.01)

(52) U.S. Cl.
 CPC ............ *G02B 7/00* (2013.01); *G02B 26/008* (2013.01); *G03B 21/14* (2013.01); *G03B 21/16* (2013.01); *G03B 21/00* (2013.01); *G03B 21/006* (2013.01); *G03B 33/12* (2013.01)

(58) Field of Classification Search
 CPC ... F21V 29/70; F21V 9/30; F21S 2/00; G02B 7/00; G02B 26/008
 See application file for complete search history.

(56) References Cited

U.S. PATENT DOCUMENTS

| | | |
|---|---|---|
| 2003/0011911 A1 | 1/2003 | Sung et al. |
| 2006/0209440 A1 | 9/2006 | Bang et al. |
| 2006/0227442 A1 | 10/2006 | Hsu et al. |
| 2009/0122273 A1 | 5/2009 | Menard et al. |
| 2014/0354960 A1 | 12/2014 | Miyazaki et al. |
| 2017/0097559 A1* | 4/2017 | Takagi ................ G02B 26/008 |
| 2018/0059403 A1 | 3/2018 | Takamatsu |

FOREIGN PATENT DOCUMENTS

| | | |
|---|---|---|
| CN | 107111219 A | 8/2017 |
| EP | 3 244 261 A1 | 11/2017 |
| JP | H04243211 A | 8/1992 |
| JP | 5-30819 U | 4/1993 |
| JP | H05030819 U | 4/1993 |
| JP | JP-H06-055113 A | 7/1994 |
| JP | 11-133415 A | 5/1999 |
| JP | 2005-84596 A | 3/2005 |
| JP | 2007-333821 A | 12/2007 |
| JP | 2010-256457 A | 11/2010 |
| JP | 2010-540997 A | 12/2010 |
| JP | 2011-113071 A | 6/2011 |
| JP | 2014-85623 A | 5/2014 |
| JP | 2015-7751 A | 1/2015 |
| JP | 2015007751 A | 1/2015 |

OTHER PUBLICATIONS

International Search Report dated Mar. 28, 2017, in PCT/JP2017/004062, filed Feb. 3, 2017.

* cited by examiner

LIGHT SOURCE APPARATUS, IMAGE DISPLAY APPARATUS, AND OPTICAL UNIT

TECHNICAL FIELD

The present technology relates to an image display apparatus such as a projector, a light source apparatus applicable to the image display apparatus, and an optical unit.

BACKGROUND ART

From the past, image display apparatuses such as a projector have been widely used. For example, light from a light source is modulated by a light modulation device such as a liquid crystal device, and the modulated light is projected onto a screen or the like so as to display an image. As the light source, a mercury lamp, a xenon lamp, an LED (Light Emitting Diode), an LD (Laser Diode), or the like is used. Of those, a solid-state light source such as an LED and an LD has advantages that a lifetime is long and thus lamp exchange as in the past is unnecessary and that the light source is lit immediately after power is turned on.

For example, Patent Literature 1 describes a light source device that uses a plurality of laser light sources, and an image display device that uses this. In the light source device described in Patent Literature 1, blue laser light emitted from a light source part is collected at a predetermined point on a phosphor provided on a phosphor wheel as shown in FIG. 3. The phosphor is excited by the blue laser light to generate yellow fluorescence. Further, the phosphor transmits a part of the blue laser light. As a result, white light obtained by synthesizing the blue laser light and yellow light is emitted from the phosphor wheel (paragraphs [0035] to [0039] of Patent Literature 1, etc.).

CITATION LIST

Patent Literature

Patent Literature 1: Japanese Patent Application Laid-open No. 2014-085623

DISCLOSURE OF INVENTION

Technical Problem

In the image display device as described in Patent Literature 1, it is important to sufficiently suppress deformation of the phosphor wheel and prevent breakage and the like. In recent years, an increase in luminance of a projector is being demanded, and high-output laser light or the like is irradiated onto the phosphor. Therefore, an amount of heat generated from the phosphor increases, and thus reliability of the phosphor wheel may be lowered.

In view of the circumstances as described above, an object of the present technology is to provide a light source apparatus, an image display apparatus, and an optical unit with which reliability of a wheel can be maintained high.

Solution to Problem

To attain the object described above, a light source apparatus according to an embodiment of the present technology includes a wheel, a rotation drive unit, and a first adhesive material.

The wheel includes a light-emitting body that emits visible light by being excited.

The rotation drive unit includes a support surface including a reference surface that comes into contact with the wheel and a non-contact surface that is set apart from the wheel, and causes the wheel supported by the support surface to rotate.

The first adhesive material is filled in at least a part of a gap between the non-contact surface and the wheel.

In this light source apparatus, the wheel is supported by the support surface including the reference surface and the non-contact surface. Further, by filling the adhesive material between the non-contact surface and the wheel, the wheel and the support surface are connected to each other. By providing a space for filling the adhesive material in this way, it becomes possible to reduce a portion that comes into contact with the wheel. Accordingly, it becomes possible to suppress a stress that acts on the wheel in a case where a thermal expansion or the like occurs, for example. As a result, reliability of the wheel can be maintained high.

The wheel may include a first surface supported by the support surface and a second surface on an opposite side of the first surface. In this case, the rotation drive unit may include a rotation member that is arranged while being set apart from the second surface. Further, the light source apparatus may further include a second adhesive material that is filled in at least a part of a gap between the rotation member and the second surface.

In this optical apparatus, gaps are provided on both sides of the wheel, and the adhesive material is filled in those gaps. Accordingly, it becomes possible to highly-accurately hold the wheel in a balanced manner.

The wheel may include a base portion that supports the light-emitting body. In this case, the support surface may support the base portion.

Accordingly, it becomes possible to sufficiently suppress a stress that acts on the base portion.

The wheel may include a heat radiation portion connected to the base portion. In this case, the support surface may support the heat radiation portion.

Accordingly, it becomes possible to diffuse heat transmitted through the heat radiation portion via the rotation drive unit and thus effectively cool the wheel.

The rotation drive unit may include a motor including the support surface.

By forming the support surface in the motor, reliability of the wheel can be raised with ease.

The rotation member may be a rotor hub connected to the motor.

By arranging the rotor hub while setting it apart from the second surface, the rotation member can be easily realized.

The rotation drive unit may include a motor that generates a rotation force and a transmission member that includes the support surface and transmits the rotation force of the motor to the wheel.

By connecting the transmission member in which the support surface is formed to the motor, it becomes possible to easily configure the rotation drive unit.

The transmission member may be a rotor hub that includes the support surface and is connected to the motor.

By forming the support surface in the rotor hub, the number of components can be suppressed.

The motor may include a rotor as the rotation member.

By arranging the rotor of the motor apart from the second surface and filling the adhesive material therebetween, it becomes possible to highly-accurately hold the wheel in a balanced manner.

The reference surface may be a surface on which the adhesive material is not applied.

Accordingly, attachment accuracy of the wheel can be improved.

The support surface may include a main surface including the non-contact surface and one or more convex portions that are formed on the main surface and each include the reference surface.

By forming the convex portions on the main surface of the wheel, the reference surface and the non-contact surface can be realized with ease. Further, design of positions, sizes, and the like of the reference surface and the non-contact surface, and the like also become easy.

The adhesive material may be filled in at least a part of a gap between the wheel and an area excluding a predetermined convex area including a periphery of the one or more convex portions.

Accordingly, it becomes possible to sufficiently prevent the adhesive material from being applied onto the reference surface.

An area of the reference surface may be smaller than an area of the non-contact surface.

Accordingly, it becomes possible to sufficiently suppress a stress that acts on the wheel and thus improve reliability of the wheel.

An image display apparatus according to an embodiment of the present technology includes a light source apparatus, an image generation system, and a projection system.

The light source apparatus includes the wheel, the rotation drive unit, the first adhesive material, and a light-emitting surface that emits light including the visible light from the light-emitting body.

The image generation system includes an image generation device that generates an image on a basis of irradiated light, and an illumination optical system that irradiates light from the light source apparatus onto the image generation device.

The projection system projects the image generated by the image generation device.

An optical unit according to an embodiment of the present technology includes the wheel, the rotation drive unit, and the first adhesive material.

Advantageous Effects of Invention

As described above, according to the present technology, reliability of the wheel can be maintained high. It should be noted that the effects described herein are not necessarily limited, and any effect described in the present disclosure may be obtained.

MODES FOR CARRYING OUT THE INVENTION

Hereinafter, embodiments of the present technology will be described with reference to the drawings.

[Image Display Apparatus]

Figure 1:
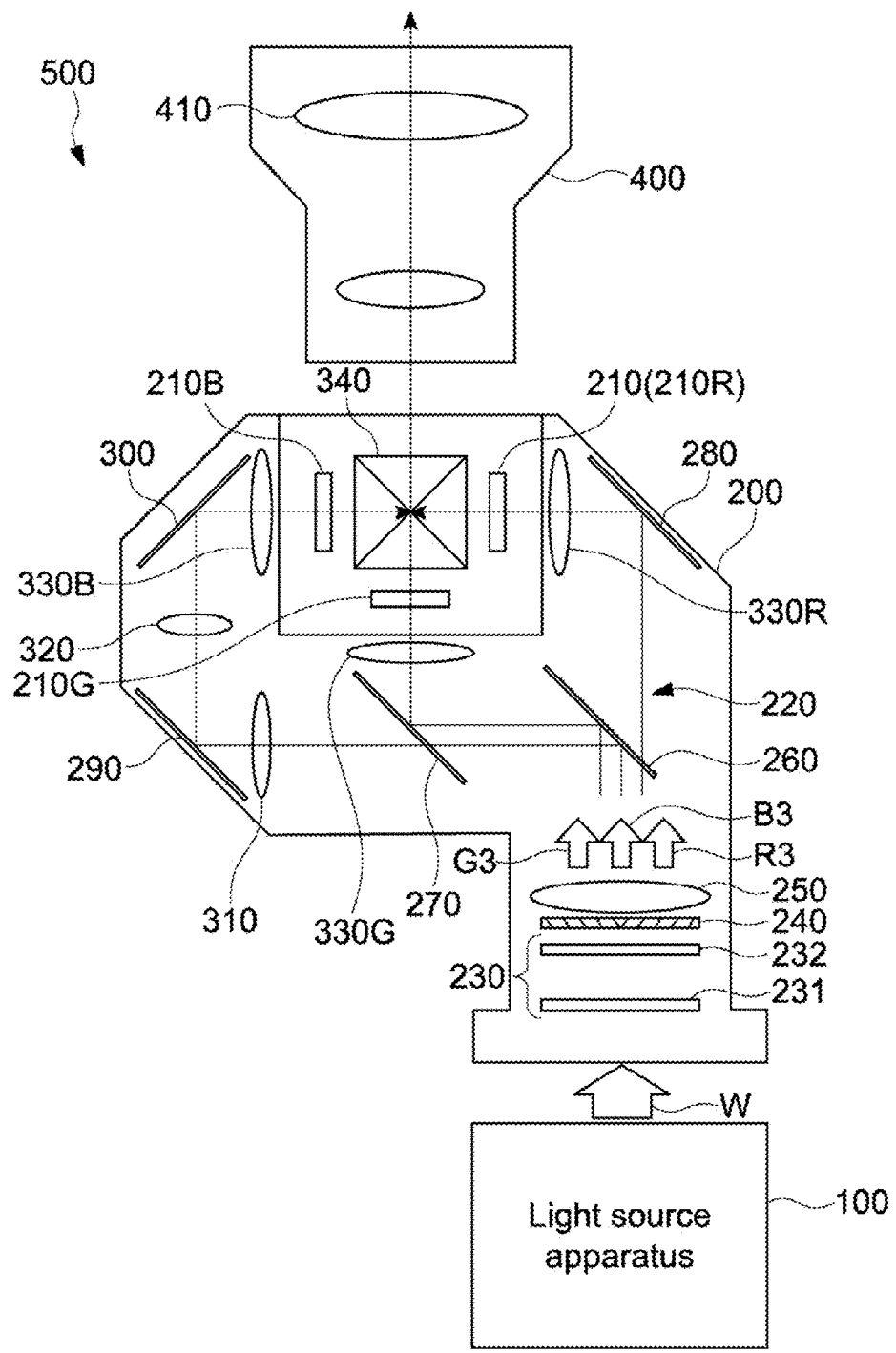
FIG. 1 A schematic diagram showing a configuration example of an image display apparatus according to an embodiment of the present technology.

FIG. 1 is a schematic diagram showing a configuration example of an image display apparatus according to an embodiment of the present technology. The image display apparatus 500 is used as a projector for presentations or digital cinema, for example. The present technology described below is also applicable to image display apparatuses used for other purposes.

The image display apparatus 500 includes a light source apparatus 100 capable of emitting white light W, an image generation system 200 that generates an image on the basis of white light W emitted from the light source apparatus 100, and a projection system 400 that projects the image generated by the image generation system 200 onto a screen (not shown) or the like.

The image generation system 200 includes an image generation device 210 that generates an image on the basis of irradiated light and an illumination optical system 220 that irradiates light emitted from the light source apparatus 100 onto the image generation device 210. Further, the image generation system 200 includes an integrator device 230, a polarization conversion device 240, and a condenser lens 250.

The integrator device 230 includes a first fly-eye lens 231 including a plurality of microlenses arranged two-dimensionally and a second fly-eye lens 232 including a plurality of microlenses arranged so as to respectively correspond to the microlenses of the first fly-eye lens 231.

White light W that enters the integrator device 230 from the light source apparatus 100 is split into a plurality of light fluxes by the microlenses of the first fly-eye lens 231, and the light fluxes are respectively imaged on the corresponding microlenses of the second fly-eye lens 232. Each of the microlenses of the second fly-eye lens 232 functions as a secondary light source, and a plurality of parallel light beams having uniform luminance are irradiated onto the polarization conversion device 240 as incident light.

As a whole, the integrator device 230 includes a function of arranging the incident light irradiated onto the polarization conversion device 240 from the light source apparatus 100 into a uniform luminance distribution.

The polarization conversion device 240 includes a function of aligning polarization states of incident light that enters via the integrator device 230 and the like. White light including blue light B3, green light G3, and red light R3 is emitted from the polarization conversion device 240 via the condenser lens 250 and the like.

The illumination optical system 220 includes dichroic mirrors 260 and 270, mirrors 280, 290, and 300, relay lenses 310 and 320, field lenses 330R, 330G, and 330B, liquid crystal light bulbs 210R, 210G, and 210B as the image generation device, and a dichroic prism 340.

The dichroic mirrors 260 and 270 include a property of selectively reflecting color light of a predetermined wavelength range and transmitting light of other wavelength ranges. Referring to FIG. 1, for example, the dichroic mirror 260 selectively reflects the green light G3 and the blue light B3. The dichroic mirror 270 selectively reflects the green light G3 out of the green light G3 and blue light B3 reflected by the dichroic mirror 260. The remaining blue light B3 is transmitted through the dichroic mirror 270. Accordingly, the light emitted from the light source apparatus 100 is separated into a plurality of color light beams of different colors. It should be noted that a configuration for separating light into a plurality of color light beams, devices used, and the like are not limited.

The separated red light R3 is reflected by the mirror 280, collimated by passing through the field lens 330R, and then enters the red-light modulation liquid crystal light bulb 210R. The green light G3 is collimated by passing through the field lens 330G and then enters the green-light modulation liquid crystal light bulb 210G. The blue light B3 passes through the relay lens 310 to be reflected by the mirror 290, and further reflected by the mirror 300 after passing through the relay lens 320. The blue light B3 reflected by the mirror 300 is collimated by passing through the field lens 330B and then enters the blue-light modulation liquid crystal light bulb 210B.

The liquid crystal light bulbs 210R, 210G, and 210B are electrically connected to a signal source (e.g., PC etc.) (not shown) that supplies image signals including image information. The liquid crystal light bulbs 210R, 210G, and 210B modulate incident light for each pixel on the basis of supplied image signals of the respective colors, and thus generate a red image, a green image, and a blue image, respectively. The modulated light beams of the respective colors (formed images) enter the dichroic prism 340 to be synthesized.

The dichroic prism 340 synthesizes the light by superimposing the light beams of the respective colors that have entered from 3 directions, and emits it toward the projection system 400.

The projection system 400 projects the image generated by the image generation device 210. The projection system 400 includes a plurality of lenses 410 and the like, and irradiates the light synthesized by the dichroic prism 340 onto a screen (not shown) or the like. As a result, a full color image is displayed.

[Light Source Apparatus]

Figure 2:
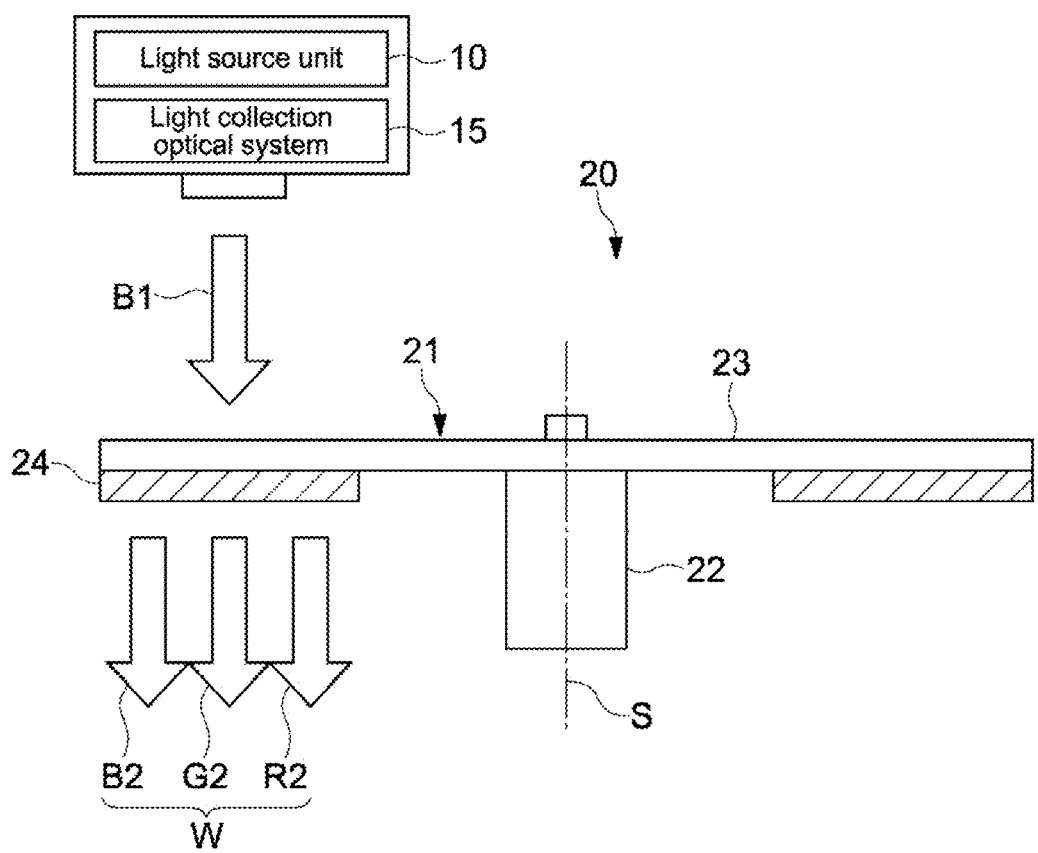
FIG. 2 A diagram schematically showing a configuration example of a light source apparatus shown in FIG. 1.

FIG. 2 is a diagram schematically showing a configuration example of the light source apparatus 100. The light source apparatus 100 includes a light source unit 10, a light collection optical system 15, and a phosphor unit 20.

The light source unit 10 includes a plurality of laser light sources (LDs). In this embodiment, a blue laser light source capable of oscillating blue laser light B1 having a peak wavelength of an emission intensity within a wavelength range of 400 nm to 500 nm is used, for example. Instead of the laser light source, other solid-state light sources such as an LED may be used. In addition, the present technology is also applicable to a case where a mercury lamp, a xenon lamp, or the like is used instead of the solid-state light source.

The light collection optical system 15 collects the blue laser light B1 emitted from the light source unit 10 at a predetermined point of the phosphor unit 20. The configuration of the light collection optical system 15 is not limited, and an aspheric reflection surface, a planar reflection surface, or the like is used as appropriate, for example. The light source unit 10 and the light collection optical system 15 may be held as a single unit by a predetermined frame or the like.

The phosphor unit 20 includes a phosphor wheel 21 and a motor 22. The phosphor wheel 21 includes a disc-shaped substrate 23 through which the blue laser light B1 is transmitted, and a phosphor layer 24 provided on that substrate 23. As the substrate 23, for example, a crystalline member such as quartz and sapphire is used.

The phosphor layer 24 includes a fluorescent substance that is excited by the blue laser light B1 to emit fluorescence. By the phosphor layer 24, a part of the blue laser light B1 emitted from the light source unit 10 is converted into light within a wavelength range from the red wavelength range to the green wavelength range (i.e., yellow light). Further, the phosphor layer 24 transmits a part of the blue laser light B1 emitted from the light source unit 10 as it is. Therefore, light including blue excitation light and yellow fluorescence is emitted from the phosphor layer 24.

As the fluorescent substance included in the phosphor layer 24, for example, a YAG (yttrium-aluminum-garnet)-based phosphor is used. It should be noted that the type of fluorescent substance, the wavelength range of light to be excited, and the wavelength range of visible light generated by the excitation are not limited.

The motor 22 is connected to a center of the substrate 23. As the motor 22 is driven, the phosphor wheel 21 rotates about a rotation shaft S.

In a state where the substrate 23 is rotated by the motor 22, the blue laser light B1 is emitted from the light source unit 10. The blue laser light B1 is irradiated onto the phosphor layer 24 so as to draw a circle relatively to the rotation of the substrate 23. As a result, as shown in FIG. 2, white light W including blue laser light B2 that has been transmitted through the phosphor layer 24 and the green light G2 and red light R2 as visible light from the phosphor layer 24 is emitted.

The phosphor unit 20 corresponds to an optical unit according to this embodiment. Further, the phosphor layer 24 corresponds to a light-emitting body, and the substrate 23 corresponds to a base portion. Further, the motor 22 functions as a rotation drive unit that causes the phosphor wheel 21 to rotate.

[Phosphor Unit]

Figure 3:
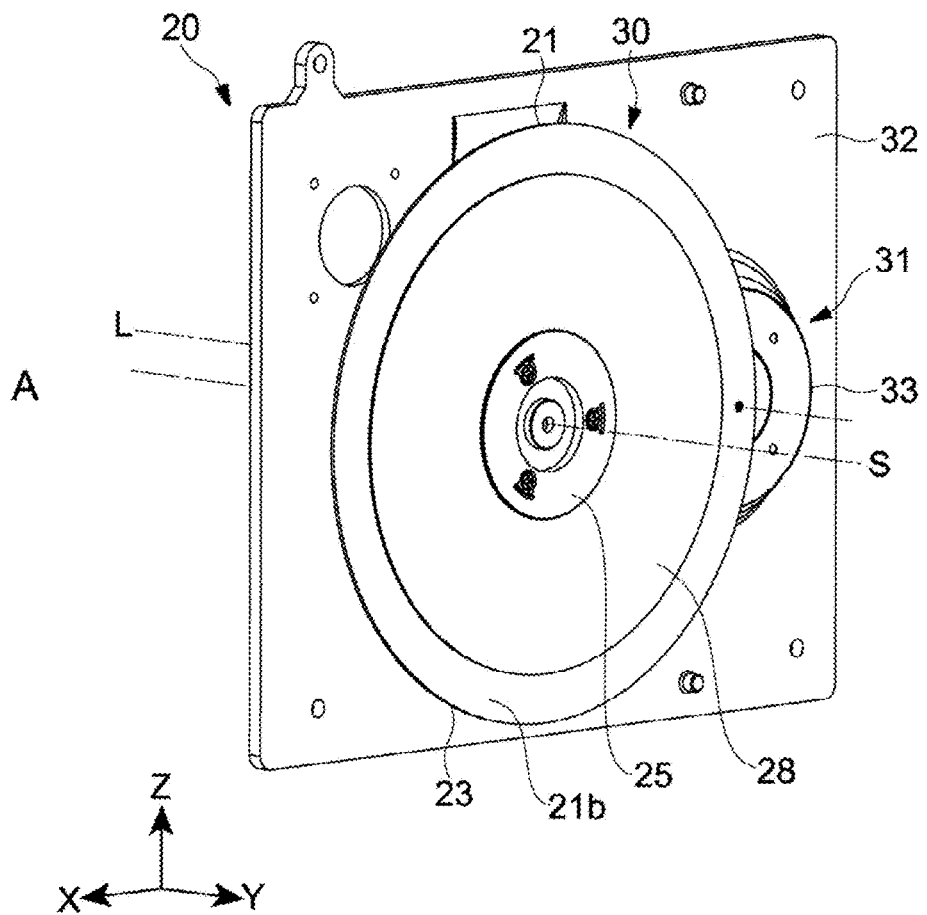
FIG. 3 Perspective views showing a specific configuration example of a phosphor unit.
Figure 3:
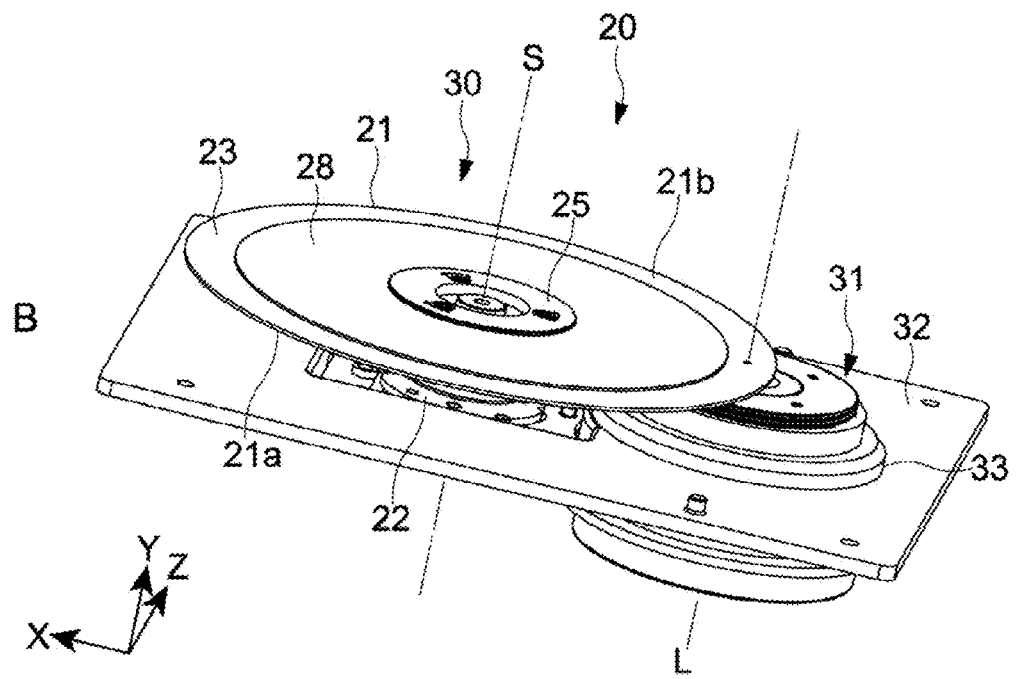

FIG. 3 are perspective view showing a specific configuration example of the phosphor unit 20. FIG. 3B is a view of the phosphor unit 20 shown in FIG. 3A as viewed from below. The phosphor unit 20 includes a wheel portion 30, a lens portion 31, and a holding member 32 that holds the wheel portion 30 and the lens portion 31 as a single unit.

The wheel portion 30 includes the phosphor wheel 21, the motor 22, and a rotor hub 25. A heat radiation plate 28 is provided on a second surface 21b on a rear side of the phosphor wheel 21. The heat radiation plate 28 is connected to the substrate 23. The rotor hub 25 is arranged at a center of the second surface 21b while opposing the heat radiation plate 28.

The phosphor layer 24 is formed along a periphery of the substrate 23 on a first surface 21a on a front side of the phosphor wheel 21 (see FIG. 5B). Further, the motor 22 is connected to the center of the first surface 21a. Details of the wheel portion 30 will be described later.

The lens portion 31 includes a lens casing portion 33, a lens group (not shown), and a light-emitting surface (not shown). The lens group is accommodated in the lens casing portion 33 and collects white light emitted from the phosphor wheel 21. The light-emitting surface emits the collected white light along an optical axis L. The specific configuration of the lens portion 31 is not limited and may be designed arbitrarily.

The holding member 32 holds the motor 22 and the lens casing portion 33. The holding method is not limited, and an arbitrary method such as fitting, bonding, and screwing may be used. Further, the holding member 32 and the lens casing portion 33 may be formed integrally.

The blue laser light B1 emitted from the light source unit 10 passes through the substrate 23 from the second surface 21b of the phosphor wheel 21 and is collected at a predetermined point on the phosphor layer 24. White light is emitted from the phosphor wheel 21 to the lens portion 31. Then, the white light W is emitted along the optical axis L by the lens portion 31.

Since the phosphor unit 20 is configured as a single unit in this way, it becomes possible to easily and highly-accurately realize positioning of the lens portion 31 and the wheel portion 30. Further, by increasing an exposed portion of the phosphor wheel 21, heat generated from the phosphor layer 24 can be effectively cooled by cooling air or the like.

Figure 4:
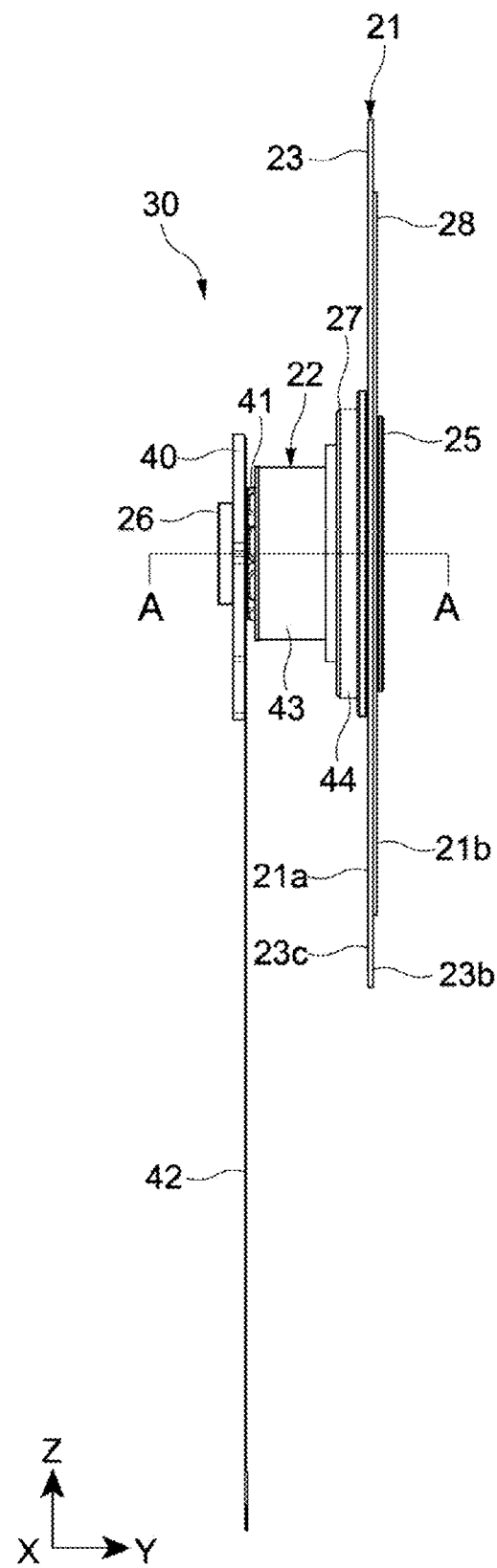
FIG. 4 A schematic diagram showing a specific configuration example of a wheel portion.
Figure 5:
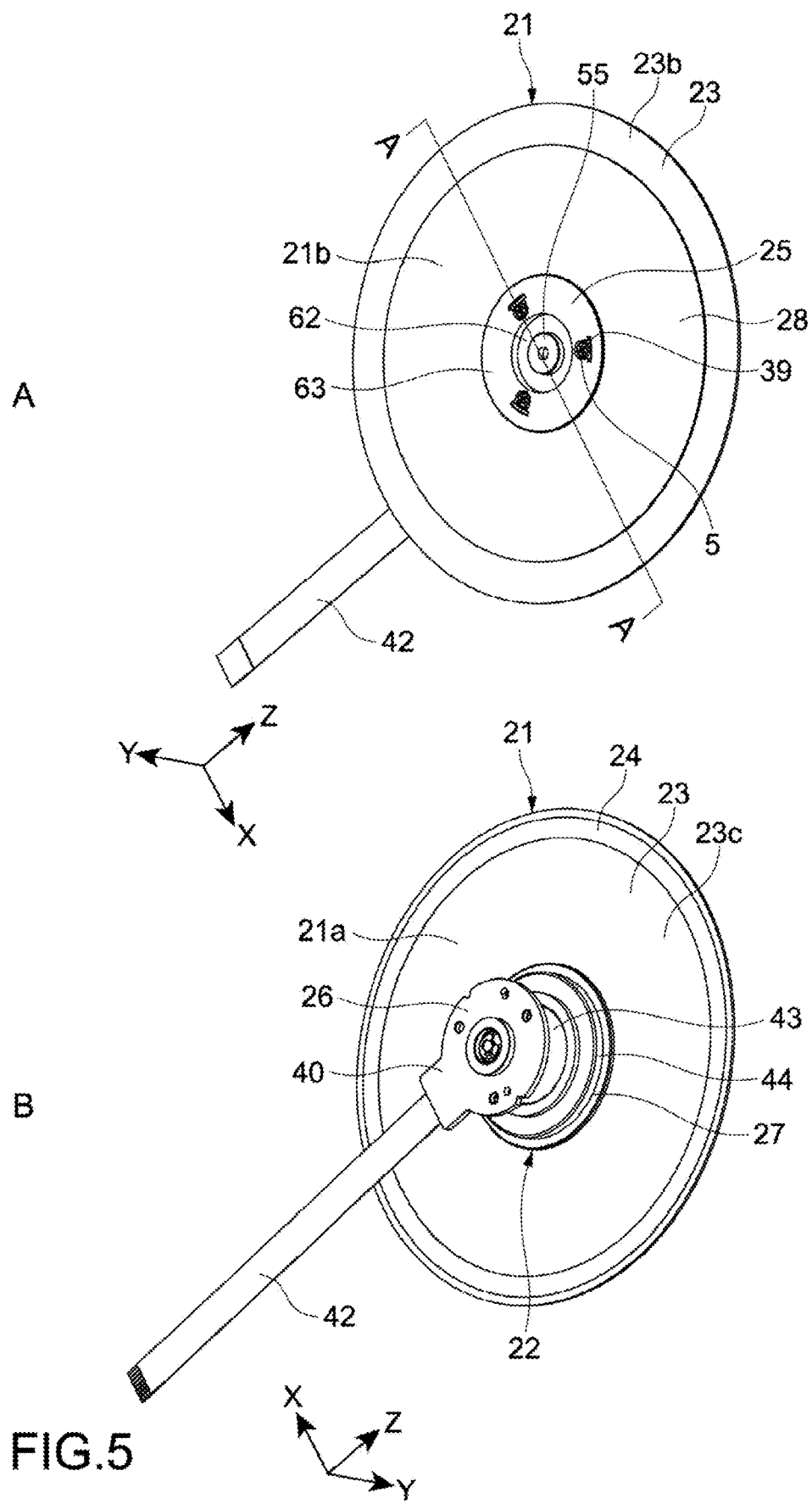
FIG. 5 Perspective views showing a specific configuration example of the wheel portion.
Figure 6:
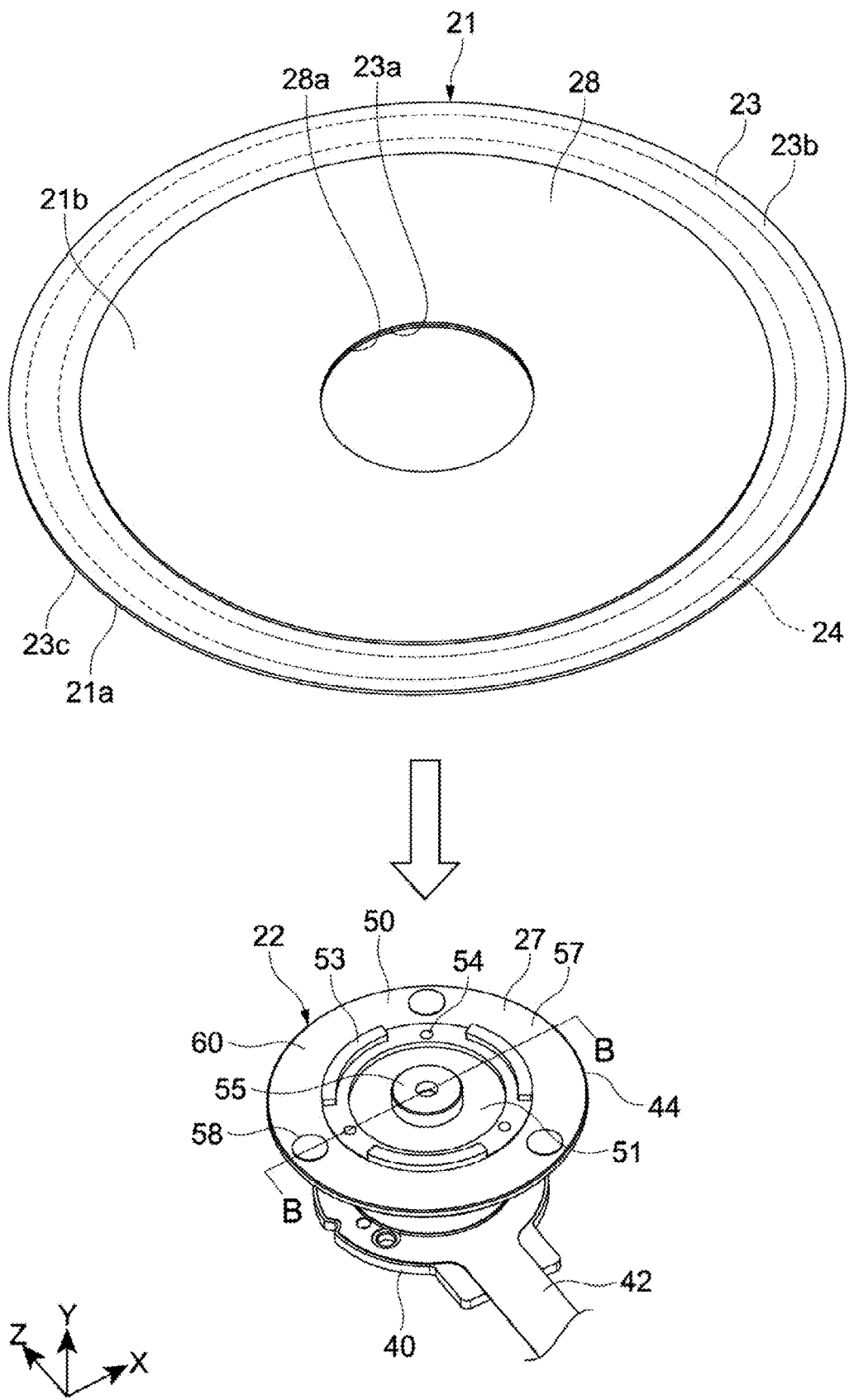
FIG. 6 A perspective view showing a configuration example of a support surface formed on a rotor of a motor.

FIGS. 4 and 5 are schematic diagrams showing specific configuration examples of the wheel portion 30. FIG. 5A is a perspective view showing the rear side of the wheel portion 30, and FIG. 5B is a perspective view showing the front side of the wheel portion 30. FIG. 6 is a perspective view showing a configuration example of the support surface formed on the rotor of the motor 22.

Figure 7:
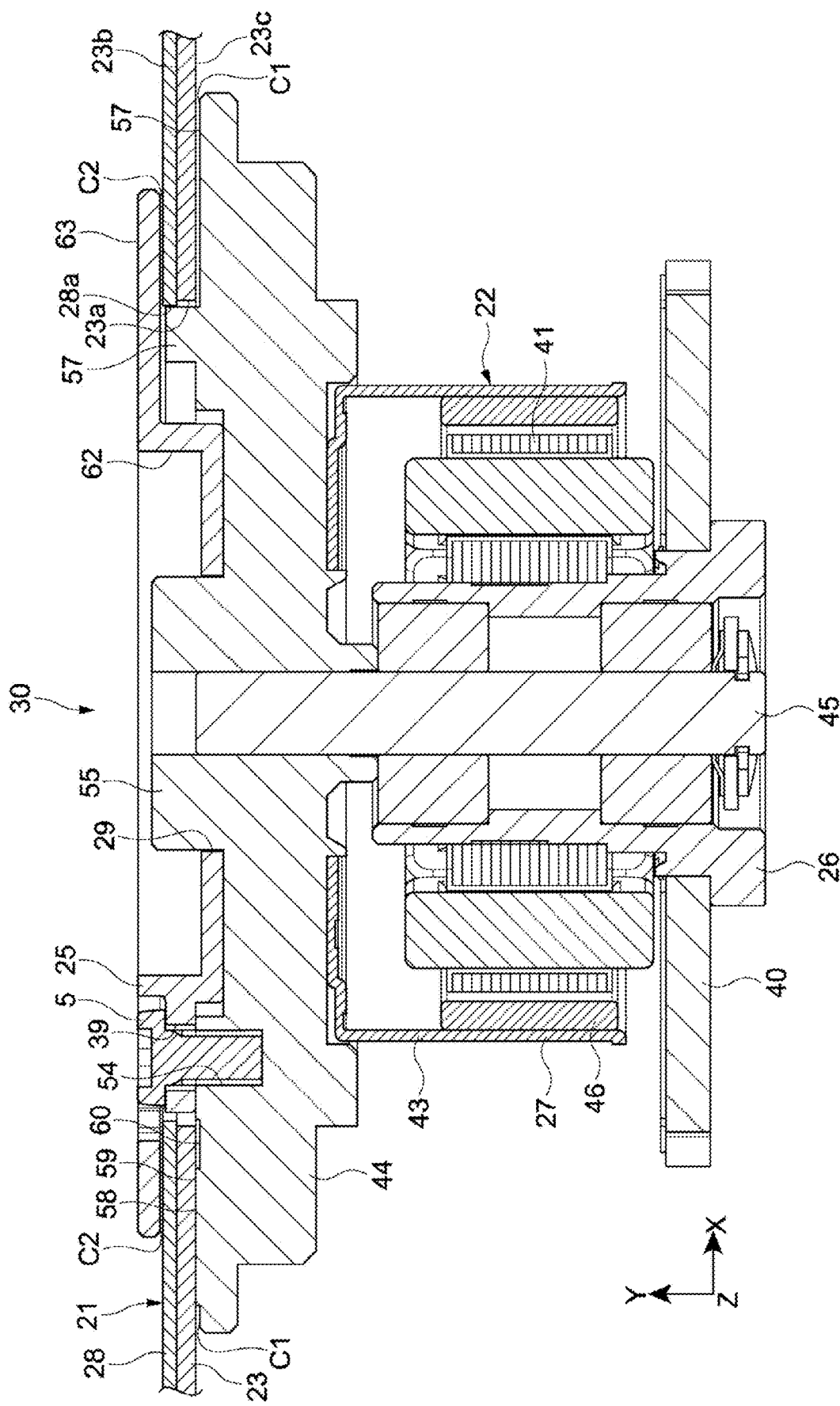
FIG. 7 A cross-sectional diagram taken along the line A-A in FIGS. 4 and 5A.

FIG. 7 is a cross-sectional diagram taken along the line A-A of FIGS. 4 and 5A. FIG. 7 corresponds to a cross-sectional diagram taken along the line that passes a convex portion 58 on a support surface 50 in FIG. 6 (e.g., cross-sectional diagram taken along line B).

The motor 22 is an outer-rotor type motor and includes a stator 26 and a rotor (rotator) 27 provided so as to cover the stator 26. The stator 26 includes a base portion 40 attached to the holding member 32 and a coil mechanism 41 supported by the base portion 40. A flexible substrate 42 is connected to the coil mechanism 41, and electric power is supplied via the flexible substrate 42.

The rotor 27 includes a yoke portion 43, a tip end portion 44, and a shaft portion 45. The yoke portion 43 is a portion that covers the coil mechanism 41, and a permanent magnet 46 is provided at a position opposing the coil mechanism 41. The tip end portion 44 is coupled to the yoke portion 43 and includes the support surface 50 that supports the phosphor wheel 21.

The shaft portion 45 is rotatably provided on the base portion 40 of the stator 26 and is connected to the tip end portion 44. When electric power is supplied to the coil mechanism 41, the yoke portion 43, the tip end portion 44, and the shaft portion 45 rotate integrally. As a result, a rotation force is generated.

The rotor hub 25 is connected to the rotor 27 of the motor 22 and rotates integrally with the rotor 27. In this embodiment, the rotor hub 25 functions as a rotation member.

As shown in FIGS. 5 and 6, the phosphor wheel 21 includes the substrate 23 having a through hole 23a at a center thereof, the heat radiation plate 28 formed on a rear surface 23b of the substrate 23, and the phosphor layer 24 formed on a front surface 23c of the substrate 23.

The heat radiation plate 28 is slightly smaller than the substrate 23, and a through hole 28a is formed at a center thereof. The substrate 23 and the heat radiation plate 28 are connected to each other while positions of the through holes 23a and 28a are made to coincide with each. In this embodiment, the heat radiation plate 28 corresponds to a heat radiation portion, and a metal material having high heat conductivity such as copper and aluminum is used, for example. Heat generated from the phosphor layer 24 by the heat radiation plate 28 can be diffused over a wide range.

As shown in FIG. 5B and as indicated by the broken line of FIG. 6, the phosphor layer 24 is formed on the front surface 23c of the substrate 23. The phosphor layer 24 is formed along the periphery in an area on an outer side of an area on the back side of the heat radiation plate 28.

As shown in FIGS. 5A and 5B, the front surface 23c of the substrate 23 on which the phosphor layer 24 is formed and the front surface of the phosphor layer 24 become a first surface 21a of the phosphor wheel 21. On the other hand, the front surface of the heat radiation plate 28 and the rear surface 23b of the substrate 23 on the outer side of the heat radiation plate 28 become a second surface 21b of the phosphor wheel 21.

As shown in FIGS. 6 and 7, the front surface 23c of the substrate 23, which is to become the first surface 21a of the phosphor wheel 21, is supported by the support surface 50 of the rotor 27. The rotor hub 25 is connected to the tip end portion 44 of the rotor 27 via the through holes 23a and 28a of the substrate 23 and the heat radiation plate 28, respectively. Therefore, the rotor hub 25 is arranged on the front surface side of the heat radiation plate 28 which is to become the second surface 21b of the phosphor wheel 21.

As shown in FIG. 6, the tip end portion 44 includes the support surface 50 that supports the phosphor wheel 21 and an attachment portion 51 to which the rotor hub 25 is attached. The support surface 50 has a ring shape, and an internal area thereof becomes the attachment portion 51.

The attachment portion 51 includes 3 ribs 53 formed at a boundary between it and the support surface 50, 3 screw holes 54, and a center protrusion portion 55. The through hole 23a of the substrate 23 is brought into contact with the 3 ribs 53. As shown in FIGS. 5A and 7, the rotor hub 25 is attached such that the center protrusion portion 55 is inserted into a center attachment hole 29 of the rotor hub 25. By positioning screw holes 39 of the rotor hub 25 and the screw holes 54 of the attachment portion 51 to coincide with one another and screwing the screws 5, the rotor hub 25 is connected to the rotor 27.

The support surface 50 includes a main surface 57 and 3 convex portions 58 formed on the main surface 57. Each of the convex portions 58 has a substantially circular planar shape as viewed from the Z direction. The 3 convex portions 58 are formed so as to be arranged at equal intervals at substantially equal angles along a circumferential direction of the support surface 50. In this embodiment, the 3 convex portions 58 are respectively formed on the outer side of the screw holes 54 formed in the attachment portion 51. The shape, size, position, number and the like of the convex portions 58 are not limited and may be designed arbitrarily.

As shown in FIG. 7, the front surface of the convex portion 58 is planar, thus functioning as a reference surface 59 according to this embodiment. The front surface 23c of the substrate 23 of the phosphor wheel 21 comes into contact with the reference surface 59. Heights of the respective convex portions 58 from the main surface 57 are aligned and set within a range of, for example, 0.1 mm to 1 mm. Of course, the height is not limited to this range.

The area of the main surface 57 where the convex portions 58 are not formed is a non-contact surface 60 that is set apart from the phosphor wheel 21. Therefore, when the phosphor wheel 21 is supported by the support surface 50, a clearance C1 is formed between the non-contact surface 60 and the substrate 23.

As shown in FIG. 7, the rotor hub 25 includes a concave portion 62 in which the attachment hole 29 is formed and a flange portion 63 extending outwardly from the concave portion 62. When the rotor hub 25 is attached, the flange portion 63 and the heat radiation plate 28 oppose each other. At this time, the attachment position of the rotor hub 25 or the depth of the concave portion 62 is designed as appropriate so that the flange portion 63 is set apart from the front surface of the heat radiation plate 28. Therefore, a clearance C2 is formed between the heat radiation plate 28 and the flange portion 63. The size of the clearance C2 is not limited and is formed within the range of, for example, 0.1 mm to 1 mm. By attaching the rotor hub 25 using the screws 5, a clearance amount can be controlled accurately.

A first adhesive material is filled in at least a part of the clearance C1 between the non-contact surface 60 and the substrate 23. Further, a second adhesive material is filled in at least a part of the clearance C2 between the heat radiation plate 28 and the flange portion 63. Typically, an adhesive is used as the first and second adhesive materials, and specific materials and the like may be set as appropriate.

Figure 8:
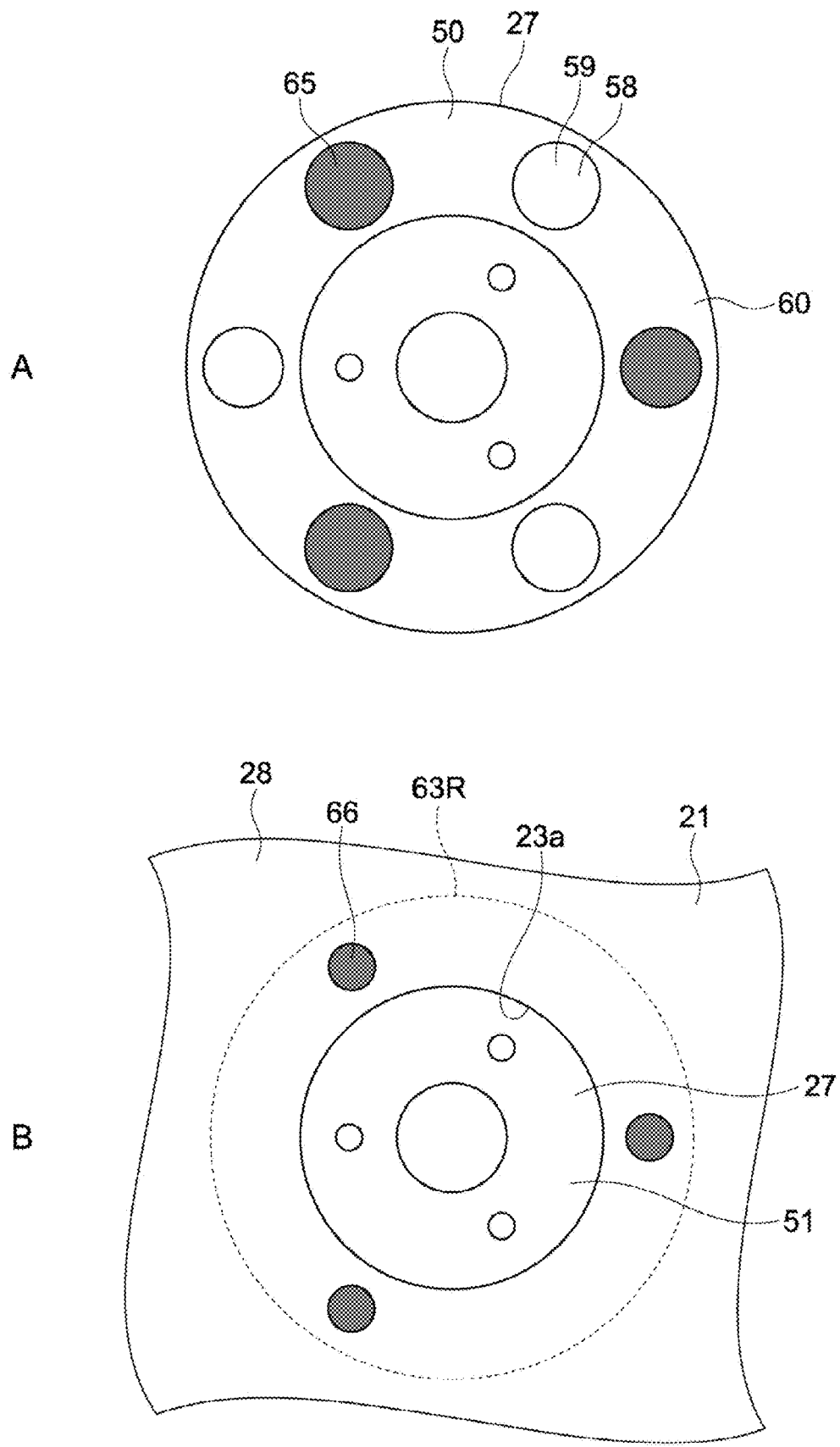
FIG. 8 Diagrams for explaining examples of filling first and second adhesive materials.

FIG. 8 are diagrams for explaining filling examples of the first and second adhesive materials. For example, as shown in FIG. 8A, a first adhesive 65 is applied to predetermined positions of the non-contact surface 60 by potting or the like. The phosphor wheel 21 is attached so as to come into contact with the reference surface 59 of the convex portions 58. As a result, the first adhesive 65 is filled in a part of the clearance C1, and the rotor 27 of the motor 22 and the phosphor wheel 21 are sufficiently connected. It should be noted that no adhesive material is applied to the reference surface 59, and the reference surface 59 and the substrate 23 are brought into direct contact with each other.

As shown in FIG. 8B, after the phosphor wheel 21 is connected to the support surface 50, the second adhesive 66 is applied to predetermined positions of an area 63R opposing the flange portion 63 of the rotor hub 25 on the heat radiation plate 28 by potting or the like. The rotor hub 25 is attached to the attachment portion 51 of the rotor 27 via the through hole 23a of the phosphor wheel 21. As a result, the second adhesive 66 is filled in a part of the clearance C2, and the rotor 27 and the rotor hub 25 are sufficiently connected.

It should be noted that it is also possible to apply the second adhesive 66 onto a lower surface of the flange portion 63 of the rotor hub 25 so as to be attached to the attachment portion 51 of the rotor 27.

In this way, the clearances C1 and C2 are formed on both the first surface 21a and second surface 21b of the phosphor wheel 21. The first and second adhesives 65 and 66 are filled in the clearances C1 and C2, and the phosphor wheel 21 is held while being sandwiched from both surfaces thereof.

The size, position, number, and the like of the areas to which the first and second adhesives 65 and 66 are to be applied are not limited and may be designed arbitrarily. For example, the first and second adhesives 65 and 66 may respectively be applied to the entire area of the non-contact surface 60 and the entire area of the area 63R opposing the flange portion 63. When the first and second adhesives 65 and 66 are applied to a wide area, it becomes possible to firmly attach the phosphor wheel 21, thus improving reliability. On the other hand, by selectively setting the application area, it becomes possible to simplify the adhesive application process and suppress material costs. Settings may be made as appropriate for each user so that desired reliability is obtained.

As described above, in the light source apparatus 100 according to this embodiment, the phosphor wheel 21 is supported by the support surface 50 including the reference surface 59 and the non-contact surface 60. Further, by filling the first adhesive 65 in the clearance C1 between the non-contact surface 60 and the phosphor wheel 21, the phosphor wheel 21 and the support surface 50 are connected.

By bringing the phosphor wheel 21 into contact with the reference surface 59, it becomes possible to accurately determine a surface position of the phosphor wheel 21 and sufficiently suppress variations of the attachment position of the phosphor wheel 21, and the like. Further, eccentricity and surface shaking of the phosphor wheel 21 can also be sufficiently suppressed. Since the first adhesive 65 is not applied onto the reference surface 59, the surface position can be secured with extremely high accuracy. As a result, white light W can be efficiently generated, and high luminance can be achieved.

Further, by forming the clearance C1 as a space to be filled with the first adhesive 65, it becomes possible to realize a sufficient connection between the phosphor wheel 21 and the rotor 27 while reducing a portion where both members come into direct contact with each other. Accordingly, a stress that acts on the substrate 23 of the phosphor wheel 21 and the like can be sufficiently suppressed in a case where thermal expansion is caused by heat generated from the phosphor layer 24 or the like, or the like, for example. Furthermore, the stress that acts on the phosphor wheel 21 can be dispersed via the first adhesive 65. This is not limited to the time thermal expansion occurs, and even in a case where minute deformation or the like occurs in the substrate 23 or the rotor 27 due to other reasons, influences thereof can be sufficiently suppressed. As a result, reliability of the phosphor wheel 21 can be maintained high.

The clearance C2 is also formed on the front side of the phosphor wheel 21, and the second adhesive 66 is filled therein. As a result, while sufficiently connecting the heat radiation plate 28 and the rotor hub 25, a stress that acts on the phosphor wheel 21 at the time thermal expansion or the like occurs can be sufficiently suppressed. Moreover, since the phosphor wheel 21 is held while being sandwiched from both surfaces, it becomes possible to highly-accurately hold the phosphor wheel 21 in a balanced manner.

From the past, for fastening a phosphor wheel used in a projector or the like, a method of coming into contact with and nipping a holding member from both sides, a method of bonding one side of a phosphor wheel, or a method that uses these in combination has been used. In the method of nipping the phosphor wheel without using an adhesive material or the like, the holding member and the phosphor wheel are firmly connected by screws or the like for maintaining attachment accuracy. As a result, a stress concentrates on a contact portion between the holding member and the phosphor wheel at a time thermal expansion or the like occurs, and thus there is a possibility that breakage such as large deformation of the wheel or cracking of the wheel will occur. In addition, in the one-side bonding method, since an adhesive surface onto which an adhesive is applied becomes a reference for a surface position, it is apt to be affected by adhesion variations, and thus highly-accurate attachment has been difficult.

In contrast, in the present technology, the reference surface 59 and the phosphor wheel 21 are brought into contact with each other in order to secure the surface position of the phosphor wheel 21. As a result, initial position accuracy is easily obtained, and high attachment accuracy can be exhibited. The area excluding the reference surface 59 becomes the non-contact surface 60, and the formed clearance is filled with the adhesive material. Accordingly, it becomes possible to sufficiently reduce a portion where the phosphor wheel 21 is pressed more than necessary and sufficiently suppress a load applied to the phosphor wheel 21. Therefore, it becomes possible to sufficiently prevent cracking of the wheel and the like and achieve high reliability.

Other Embodiments

The present technology is not limited to the embodiment described above, and various other embodiments can be realized.

Figure 9:
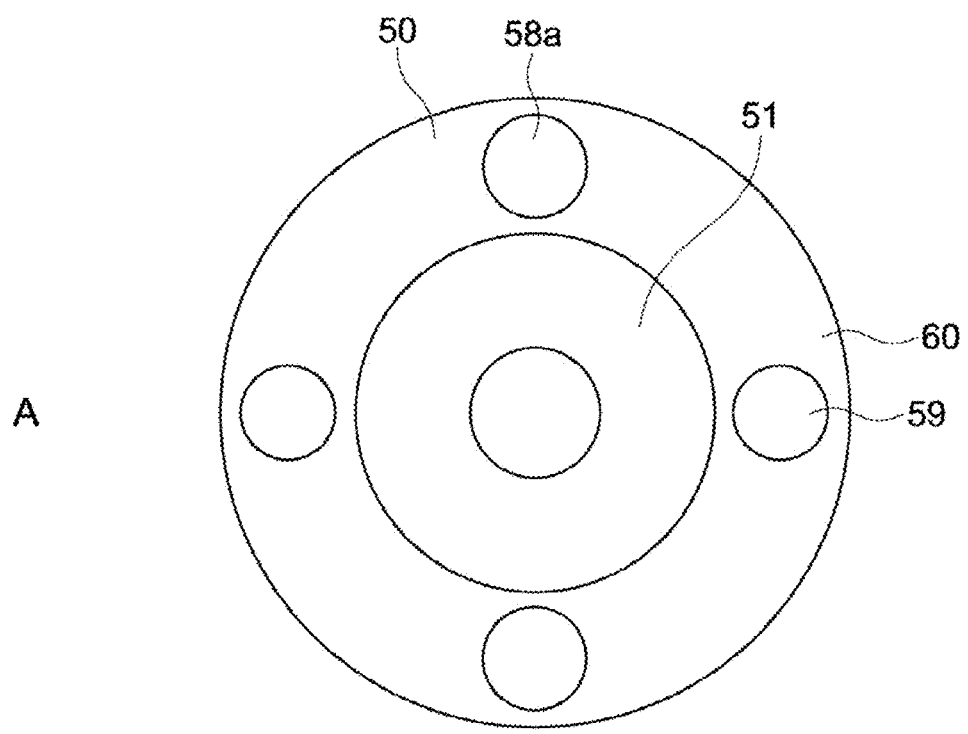
FIG. 9 Schematic diagrams showing other configuration examples of a convex portion formed on the support surface.
Figure 9:
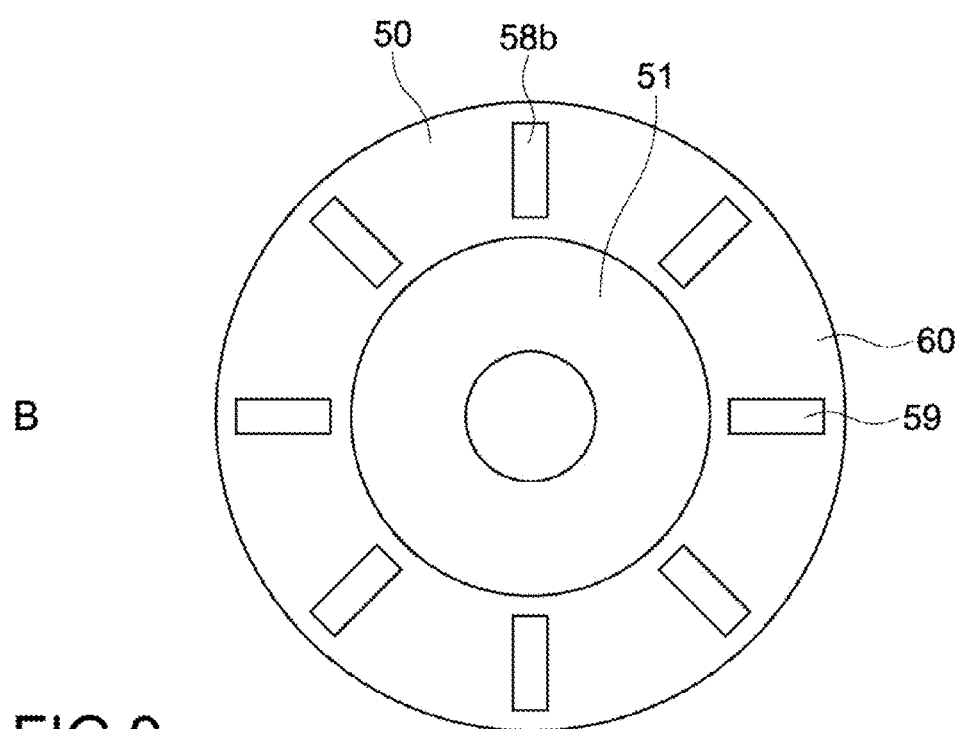
Figure 10:
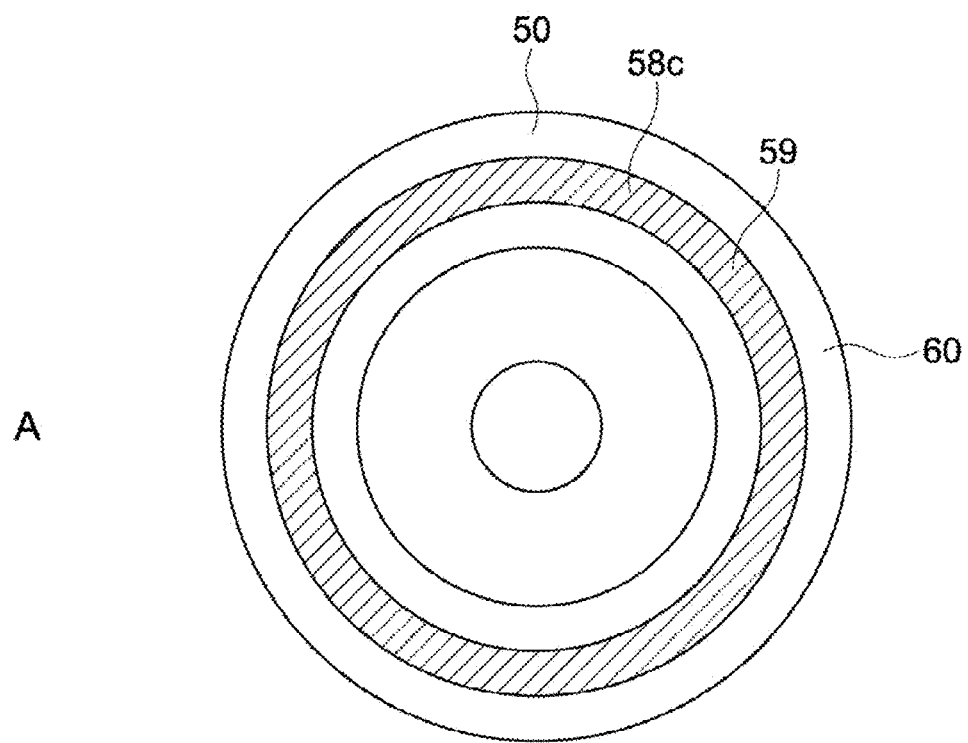
FIG. 10 Schematic diagrams showing other configuration examples of the convex portion formed on the support surface.
Figure 10:
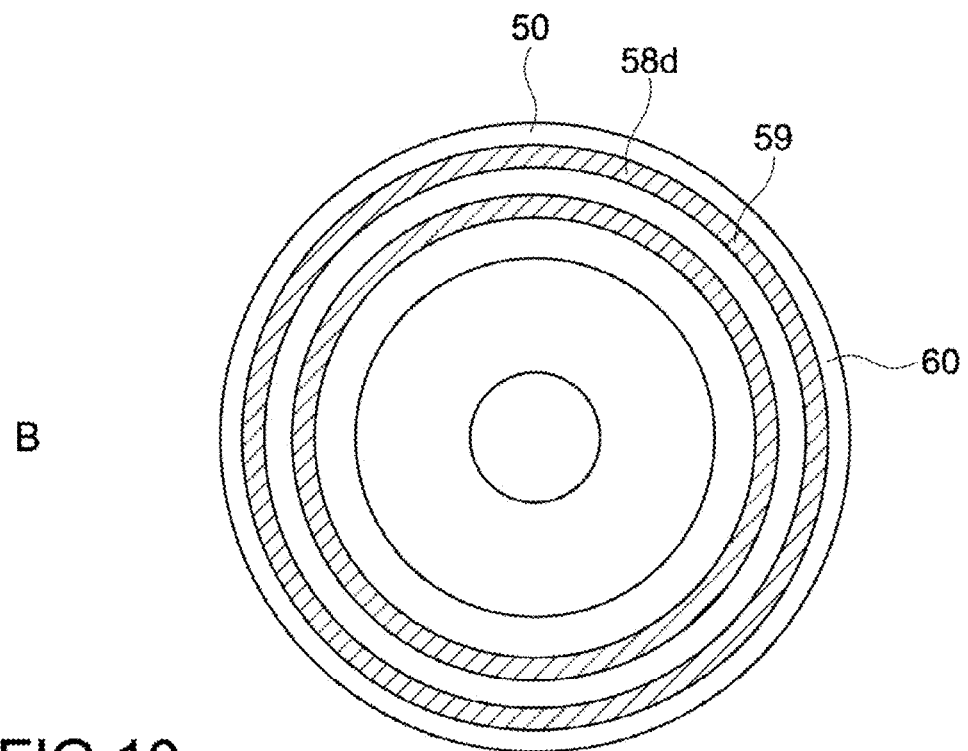

FIGS. 9 and 10 are schematic diagrams showing other configuration examples of the convex portions 58 formed on the support surface 50. As shown in FIG. 9A, 4 circular convex portions 58*a* may be formed on the support surface 50 at intervals of substantially 90 degrees. Alternatively, as shown in FIG. 9B, 8 rectangular convex portions 58*b* may be formed at intervals of substantially 45 degrees. In addition, a plurality of convex portions may be formed radially from the center of the attachment portion 51.

As shown in FIG. 10A, a ring-shaped convex portion 58*c* may be formed at substantially the center of the support surface 50 in a width direction (hatched portion). Alternatively, as shown in FIG. 10B, a plurality of ring-shaped convex portions 58*d* may be formed concentrically. By forming the convex portions 58 in this way, the reference surface 59 and the non-contact surface 60 can be formed with ease. Moreover, the shapes, sizes, positions, and the like of the reference surface 59 and the non-contact surface 60 can also be easily designed.

By enlarging the reference surface 59, attachment accuracy of the phosphor wheel 21 can be improved. On the other hand, by reducing the size of the reference surface 59, a stress that acts on the phosphor wheel 21 can be reduced. Typically, the area of the reference surface 59 is designed to be smaller than the area of the non-contact surface 60. This makes it possible to exhibit high reliability. Of course, the present technology is not limited to this, and settings may be made as appropriate for each user so that the phosphor wheel 21 can exert desired characteristics.

Figure 11:
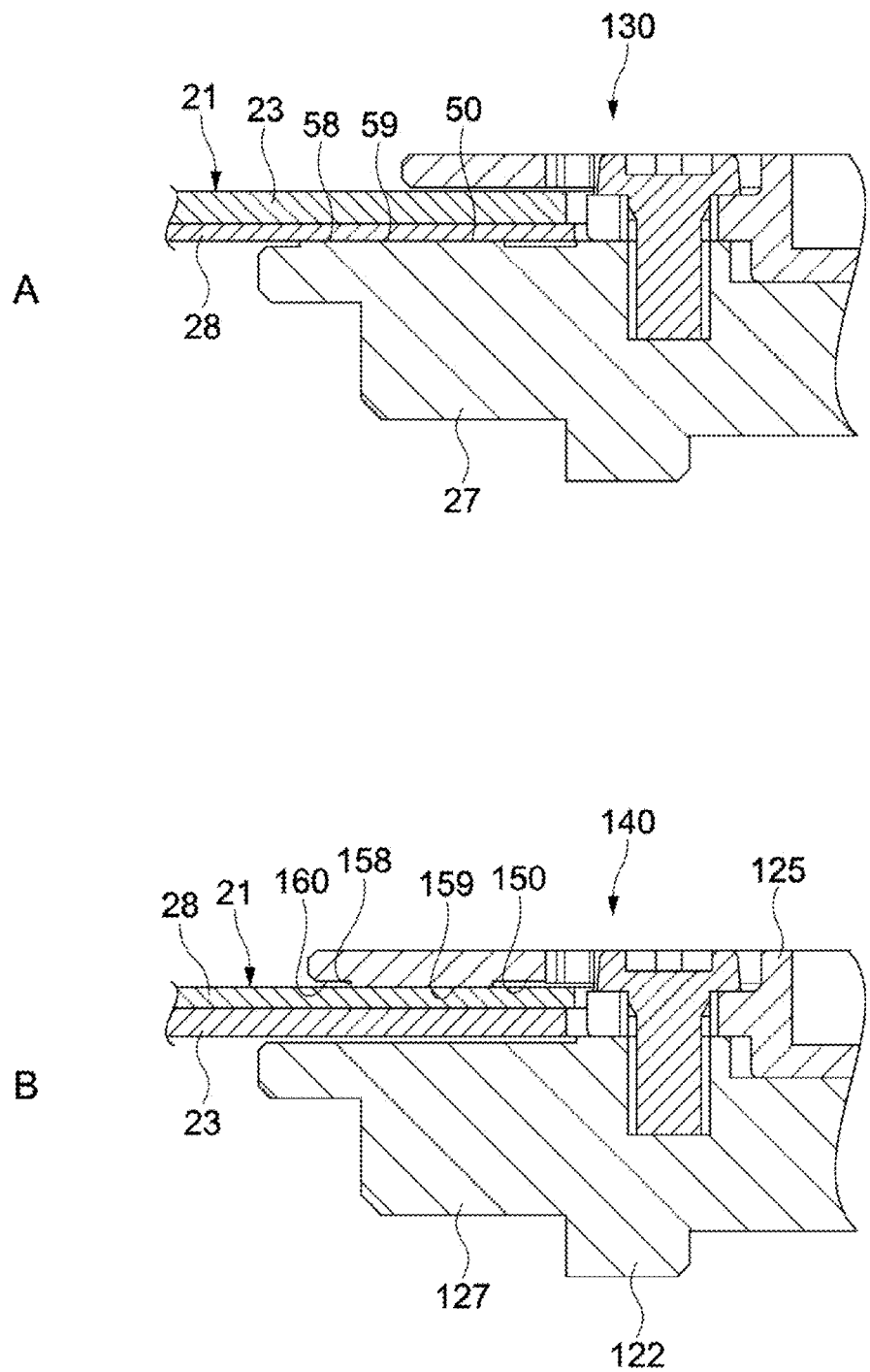
FIG. 11 Partially-enlarged diagrams showing other configuration examples of the wheel portion.

FIG. 11 are partially-enlarged diagrams showing other configuration examples of the wheel portion. In a wheel portion 130 shown in FIG. 11A, the phosphor wheel 21 is supported by the support surface 50 such that the heat radiation plate 28 comes into contact with the reference surface 59 of the convex portion 58. Specifically, the phosphor wheel 21 is set upside down. In this case, the front surface of the heat radiation plate 28 becomes the first surface of the phosphor wheel 21. Further, the front surface of the substrate 23 becomes the second surface of the phosphor wheel 21. By bringing the heat radiation plate 28 into contact with the reference surface 59, it becomes possible to dissipate heat transmitted to the heat radiation plate 28 via the rotor 27. Therefore, it becomes possible to efficiently cool the heat generated from the phosphor layer and sufficiently suppress an influence of heat. As a result, reliability of the phosphor wheel 21 can be improved.

Even in a case where the substrate 23 is brought into contact with the reference surface 59, heat transmitted to the substrate 23 can be diffused via the rotor 27, and a heat radiation effect can be obtained. By bringing the heat radiation plate 28 into contact, the heat radiation effect thereof can be raised. It should be noted that the heat radiation plate 28 may be formed on both sides of the substrate 23. This further improves the heat diffusion effect.

In a wheel portion 140 shown in FIG. 11B, a support surface 150 including one or more convex portions 158 is formed on a flange portion 163 of a rotor hub 125. Therefore, a reference surface 159 and a non-contact surface 160 are formed on the flange portion 163. The front surface of the heat radiation plate 28 opposing the flange portion 163 of the phosphor wheel 21 becomes the first surface and is brought into contact with the reference surface 159. Further, a first adhesive material is filled between the heat radiation plate 28 and the non-contact surface 160. Typically, the rotor hub 125 is attached to the rotor 127 in a state where the phosphor wheel 21 is adhered onto the rotor hub 125, though of course is not limited to this.

The front surface of the substrate 23 that is to become the second surface of the phosphor wheel 21 and the rotor 127 are set apart from each other. The second adhesive material is filled between the substrate 23 and the rotor 127. As a result, the phosphor wheel 21 is sufficiently held from both sides. In this way, the support surface 150 may be formed on the front side of the phosphor wheel 21. In the example shown in FIG. 11, the rotor hub 125 functions as a transmission member that transmits the rotation force of the motor 122 to the phosphor wheel 21. Further, the rotor 27 functions as the rotation member.

The transmission member may be arranged on the side on which the motor is arranged with respect to the phosphor wheel. Specifically, the rotor of the motor, the transmission member, and the phosphor wheel may be arranged in the stated order. Then, the rotation member such as a rotor hub is connected to the rotor or the transmission member. Accordingly, it becomes possible to hold the phosphor wheel from both sides. By forming the transmission member as a member separate from the motor, a generally-used motor can be used. Further, design of the rotation drive unit and the like become easy.

Components different from the motor and the rotor hub may be used as the transmission member and the rotation member according to the present technology. Meanwhile, by forming the support surface on the rotor or the rotor hub, the number of components can be suppressed, and component costs can be reduced. It should be noted that the present technology is applicable to an arbitrary motor such as an inner-rotor type motor.

A configuration that holds only the first surface of the phosphor wheel using the motor or transmission member including the support surface is also possible, that is, a configuration in which the rotation member is not arranged on the second surface side of the phosphor wheel. For example, depending on the rotation speed, usage mode, and the like, even the configuration that holds only the first surface can be sufficiently used.

Figure 12:
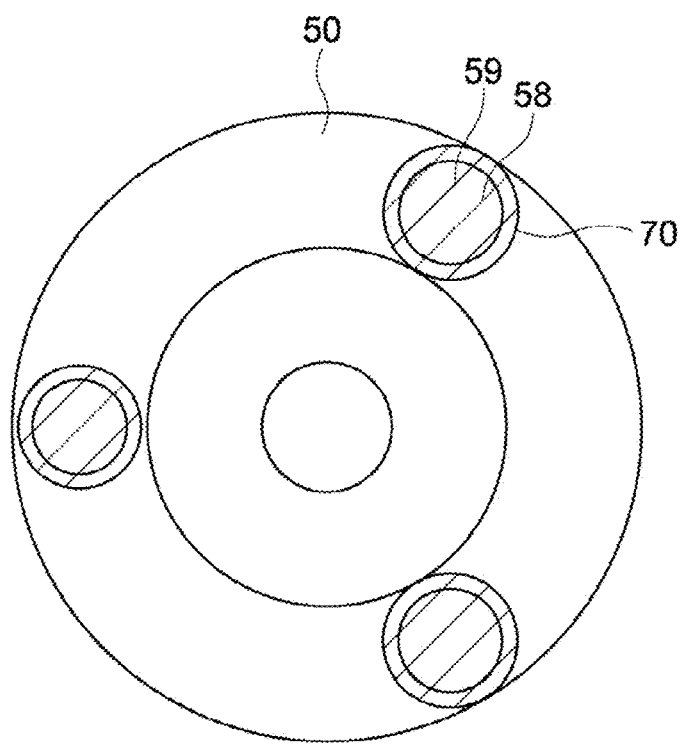
FIG. 12 A diagram for explaining a setting example of an area onto which a first adhesive material is applied.

FIG. 12 is a diagram for explaining a setting example of an area onto which the first adhesive material is to be applied. An application-prohibited area that uses the convex portions 58 (reference surface 59) as a reference may be set so that the first adhesive material is not applied onto the reference surface 59. For example, as shown in FIG. 12, a convex portion area 70 including the convex portions 58 and a periphery of the convex portions 58 is set as the application-prohibited area. The first adhesive material is filled in at least a part of a gap between an area excluding the convex portion area 70 and the phosphor wheel. As a result, adhesion of the first adhesive material and the like onto the reference surface 59 can be sufficiently prevented from occurring. It should be noted that the shape and size of the convex portion area 70 may be set arbitrarily.

One or more concave portions may be formed on the support surface. In this case, an area excluding the concave portion becomes the reference surface, and a surface inside the concave portion becomes the non-contact surface. Further, the non-contact surface may be a curved surface. The shape of the non-contact surface is not limited as long as a clearance for filling the adhesive material is formed.

At least two of the feature portions according to the present technology described above can be combined. In other words, various feature portions described in the respective embodiments may be arbitrarily combined without distinguishing the embodiments from one another. Moreover, the various effects described above are mere examples and should not be limited thereto, and other effects may also be exerted.

It should be noted that the present technology can also take the following configurations.

(1) A light source apparatus, including:
a wheel including a light-emitting body that emits visible light by being excited;
a rotation drive unit that includes a support surface including a reference surface that comes into contact with the wheel and a non-contact surface that is set apart from the wheel, and causes the wheel supported by the support surface to rotate; and
a first adhesive material filled in at least a part of a gap between the non-contact surface and the wheel.

(2) The light source apparatus according to (1), in which
the wheel includes a first surface supported by the support surface and a second surface on an opposite side of the first surface,
the rotation drive unit includes a rotation member that is arranged while being set apart from the second surface, and
the light source apparatus further includes
a second adhesive material that is filled in at least a part of a gap between the rotation member and the second surface.

(3) The light source apparatus according to (1) or (2), in which
the wheel includes a base portion that supports the light-emitting body, and
the support surface supports the base portion.

(4) The light source apparatus according to (1) or (2), in which
the wheel includes a heat radiation portion connected to the base portion, and
the support surface supports the heat radiation portion.

(5) The light source apparatus according to any one of (1) to (4), in which
the rotation drive unit includes a motor including the support surface.

(6) The light source apparatus according to (2), in which
the rotation drive unit includes a motor including the support surface, and
the rotation member is a rotor hub connected to the motor.

(7) The light source apparatus according to any one of (1) to (4), in which
the rotation drive unit includes a motor that generates a rotation force and a transmission member that includes the support surface and transmits the rotation force of the motor to the wheel.

(8) The light source apparatus according to (7), in which
the transmission member is a rotor hub that includes the support surface and is connected to the motor.

(9) The light source apparatus according to (2), in which
the transmission member is a rotor hub that includes the support surface and is connected to the motor, and
the motor includes a rotor as the rotation member.

(10) The light source apparatus according to any one of (1) to (9), in which
the reference surface is a surface on which the adhesive material is not applied.

(11) The light source apparatus according to any one of (1) to (10), in which
the support surface includes a main surface including the non-contact surface and one or more convex portions that are formed on the main surface and each include the reference surface.

(12) The light source apparatus according to (11), in which
the adhesive material is filled in at least a part of a gap between the wheel and an area excluding a predetermined convex area including a periphery of the one or more convex portions.

(13) The light source apparatus according to any one of (1) to (12), in which
an area of the reference surface is smaller than an area of the non-contact surface.

REFERENCE SIGNS LIST

C1, C2 clearance
20 phosphor unit
21 phosphor wheel
21a first surface
21b second face
22, 122 motor
23 substrate
24 phosphor layer
25, 125 rotor hub
26 stator
27, 127 rotor
28 heat radiation plate
30, 130, 140 wheel portion
50, 150 support surface
57 main surface
58, 58a to 58d, 158 convex portion
59, 159 reference surface
60, 160 non-contact surface
65 first adhesive
66 second adhesive
70 convex portion area
100 light source apparatus
200 image generation system
400 projection system
500 image display apparatus

The invention claimed is:

1. A light source apparatus, comprising:
a light source;
a wheel including a light-emitting body that is configured to emit visible light;
a rotation drive unit that includes a support surface including a reference surface that comes into contact with the wheel and a non-contact surface that is recessed and set apart from the wheel, and configured to cause the wheel supported by the support surface to rotate; and
a first adhesive material filled in at least a part of a gap between the non-contact surface and the wheel.

2. The light source apparatus according to claim 1, wherein the wheel includes a first surface supported by the support surface and a second surface on an opposite side of the first surface, the rotation drive unit includes a rotation member that is arranged while being set apart from the second surface, and the light source apparatus further comprises a second adhesive material that is filled in at least a part of a gap between the rotation member and the second surface.

3. The light source apparatus according to claim 1, wherein
the wheel includes a base portion that supports the light-emitting body, and
the support surface supports the base portion.

4. The light source apparatus according to claim 3, wherein
the wheel includes a heat radiation portion connected to the base portion, and
the support surface supports the heat radiation portion.

5. The light source apparatus according to claim 1, wherein
the rotation drive unit includes a motor including the support surface.

6. The light source apparatus according to claim 2, wherein
the rotation drive unit includes a motor including the support surface, and
the rotation member is a rotor hub connected to the motor.

7. The light source apparatus according to claim 1, wherein
the rotation drive unit includes a motor that is configured to generate a rotation force and a transmission member that includes the support surface and configured to transmit the rotation force of the motor to the wheel.

8. The light source apparatus according to claim 7, wherein
the transmission member is a rotor hub that includes the support surface and is connected to the motor.

9. The light source apparatus according to claim 7, wherein
the transmission member is a rotor hub that includes the support surface and is connected to the motor, and
the motor includes a rotor.

10. The light source apparatus according to claim 1, wherein
the reference surface is a surface on which the first adhesive material is not applied.

11. The light source apparatus according to claim 1, wherein
the support surface includes a main surface including the non-contact surface and one or more convex portions that are formed on the main surface and each of the one or more convex portions includes the reference surface.

12. The light source apparatus according to claim 11, wherein
the first adhesive material is filled in at least a part of a gap between the wheel and an area excluding a predetermined convex area including a periphery of the one or more convex portions.

13. The light source apparatus according to claim 1, wherein
an area of the reference surface is smaller than an area of the non-contact surface.

14. An image display apparatus, comprising:
(a) a light source apparatus including
a wheel including a light-emitting body that is configured to emit visible light,
a rotation drive unit that includes a support surface including a reference surface that comes into contact with the wheel and a non-contact surface that is set apart from the wheel, and configured to cause the wheel supported by the support surface to rotate,
a first adhesive material filled in at least a part of a gap between the non-contact surface and the wheel, and
a light-emitting surface that is configured to emit light including the visible light from the light-emitting body;
(b) an image generation system including
an image generation device configured to generate an image on a basis of irradiated light, and
an illumination optical system configured to irradiate the light from the light source apparatus onto the image generation device; and
(c) a projection system configured to project the image generated by the image generation device.

15. An optical unit, comprising:
a wheel including a light-emitting body that configured to emit visible light;
a rotation drive unit that includes a support surface including a reference surface that comes into contact with the wheel and a non-contact surface that is recessed and set apart from the wheel, and configured to cause the wheel supported by the support surface to rotate; and
a first adhesive material filled in at least a part of a gap between the non-contact surface and the wheel.

* * * * *